No. 734,961. PATENTED JULY 28, 1903.
G. R. ROUGHLEY.
EXTENSION TABLE.
APPLICATION FILED APR. 7, 1902.
NO MODEL. 2 SHEETS—SHEET 1.
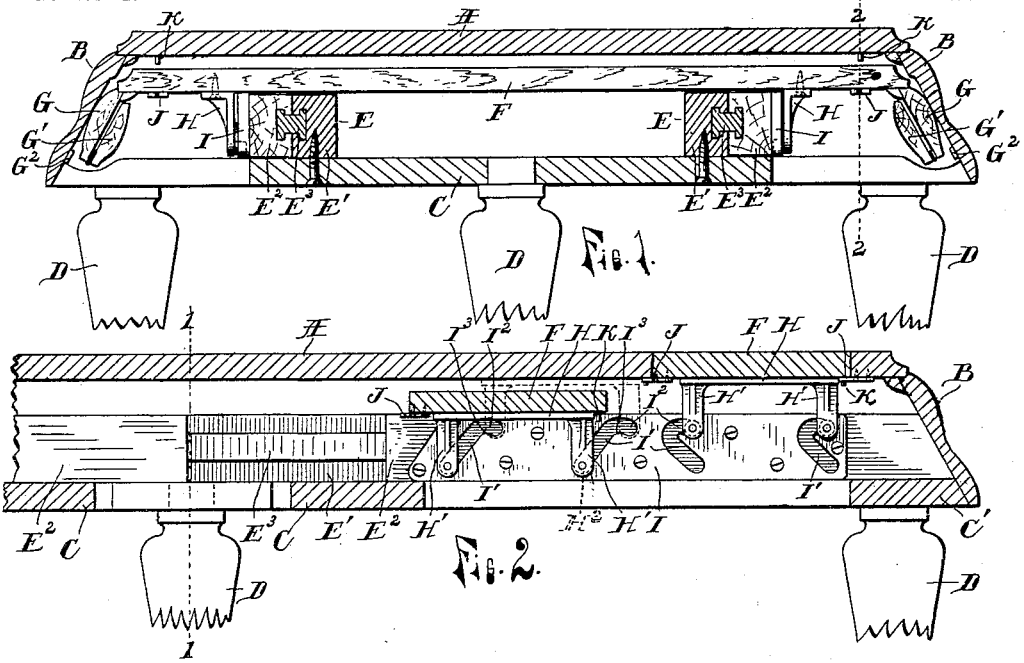
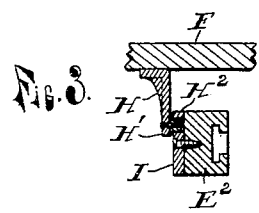
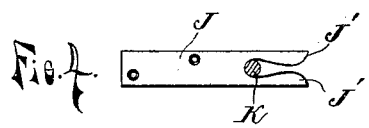
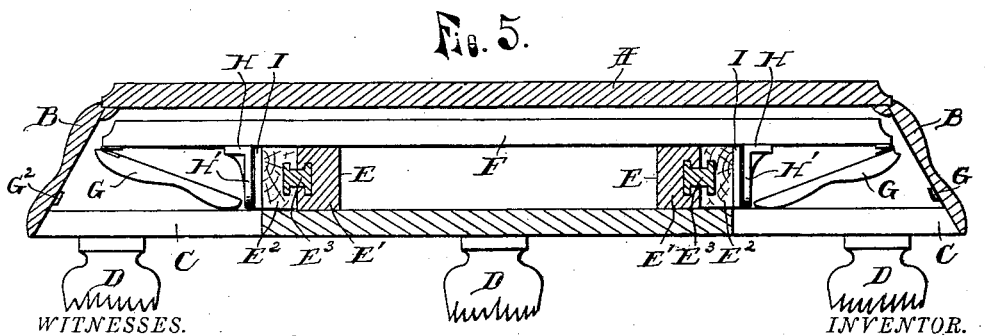
WITNESSES. INVENTOR.
L. E. Flanders George R. Roughley
T. G. Longstaff By
Attorneys.

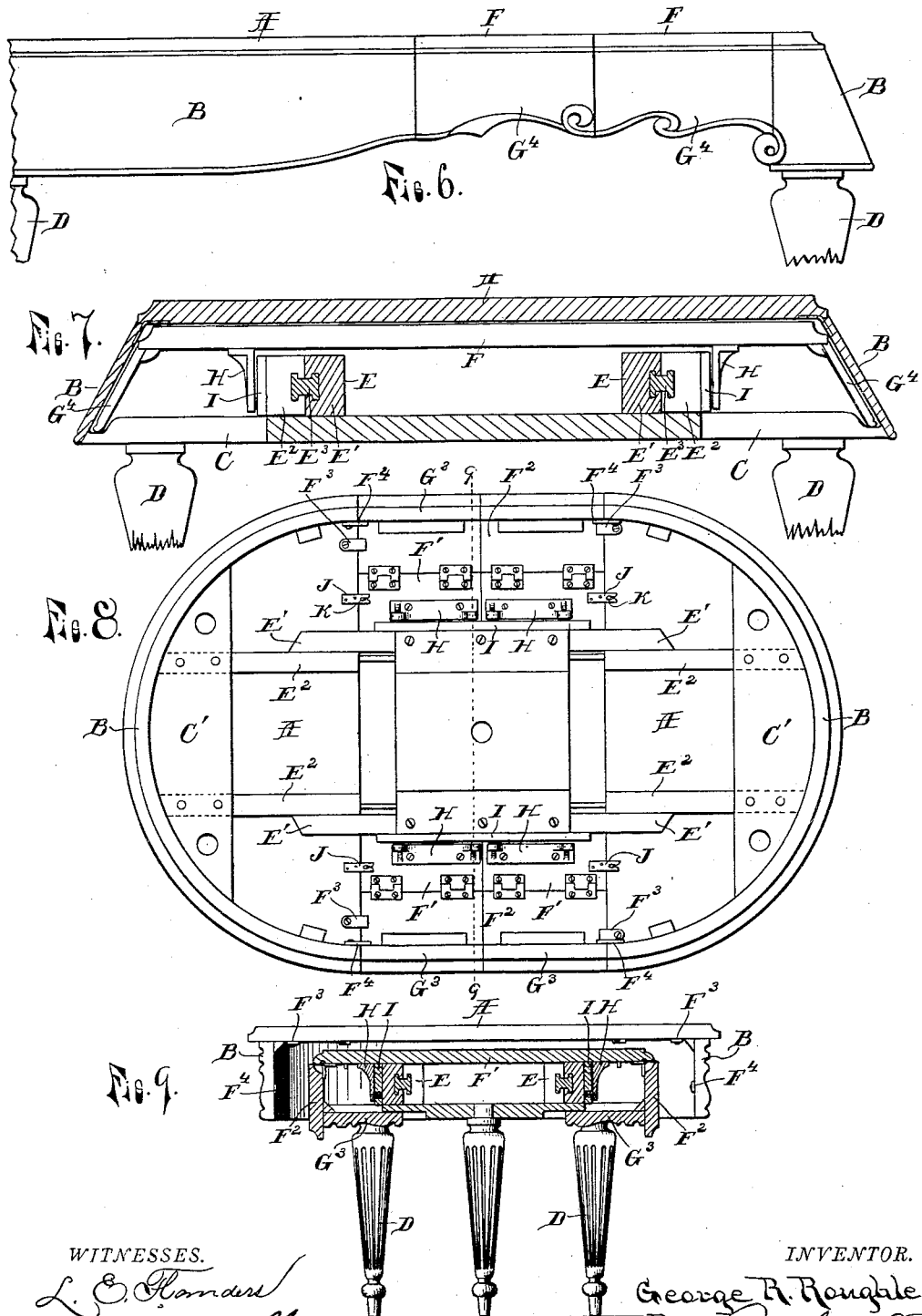

No. 734,961. Patented July 28, 1903.

UNITED STATES PATENT OFFICE.

GEORGE R. ROUGHLEY, OF DETROIT, MICHIGAN.

EXTENSION-TABLE.

SPECIFICATION forming part of Letters Patent No. 734,961, dated July 28, 1903.

Application filed April 7, 1902. Serial No. 101,651. (No model.)

*To all whom it may concern:*

Be it known that I, GEORGE R. ROUGHLEY, a citizen of the United States of America, residing at Detroit, in the county of Wayne and State of Michigan, have invented certain new and useful Improvements in Extension-Tables, of which the following is a specification, reference being had therein to the accompanying drawings.

My invention relates to improvements in extension-tables, and especially to that class of such tables in which the supplemental leaves are stored beneath the table-top in such a manner as to be readily accessible when the table is extended; and its object is to provide simple and compact mechanism for guiding the leaves, so that they will be moved out of contact with each other when lowered, and mechanism for rigidly supporting the leaves to prevent their getting out of line with the top or varying, it being also an object of this invention to so arrange and construct the leaves that when they are in place for use the top and its side rails will present a continuous and unbroken outline, said leaves being the same length as the top and each provided with attached rail-sections.

To this end the invention consists in securing to the under side of the leaves downwardly-projecting supporting members or arms to engage guide-slots in plates secured to the extension-slides or table-frame, the slots engaged by the arms on one leaf being inclined downward in a direction opposite to that of the slots for the arms of the opposing leaf, so that as the arms pass down the slots the leaves will be moved apart, and the upper ends of said slots are formed with lateral extensions or recesses to receive the arms when the leaves are up and securely hold the same in that position; and the invention consists in the particular construction of the side rails, whereby when the leaves and their attached rail-sections are lowered they may be moved laterally between the fixed portions of the side rails, the invention also consisting in providing certain other new and useful features, all as hereinafter more fully described, and particularly pointed out in the claims, reference being had to the accompanying drawings, in which—

Figure 1 is a transverse vertical section on the line 1 1 of Fig. 2 of a device embodying my invention; Fig. 2, a longitudinal section on the line 2 2 of Fig. 1. Fig. 3 is a sectional detail of one of the supporting-arms and its slotted plate; Fig. 4 a plan view of one of the connecting-catches. Fig. 5 is a transverse vertical section showing a modified construction. Fig. 6 is a side elevation showing a modified form of side rail; Fig. 7, a transverse vertical section of the same. Fig. 8 is an inverted plan view of a modified form of table, and Fig. 9 a section of the same on the line 9 9 of Fig. 8.

A is the fixed table-top, which is supported by the outwardly and downwardly inclined side and end rails B, which rails are secured at their lower edges to the transverse supporting-strips C and C', to which the table-legs D are secured. To the upper side of these strips and at a distance from the side rails are secured the extension-slides E, the member E' of each slide being secured near its middle to the strips C, and the other members E², whose ends abut at the center of the table, are secured at one end to the strips C' at each end of the table and slide upon the dovetail connecting-bar E³, the strips, legs, and extension-slides forming the supporting-frame of the table.

F F are the supplemental leaves, which are of a length and formed at their ends to match the table-top, rail-sections G, corresponding in form to the side rail B, being secured to the ends of the leaves. These rail-sections G are divided longitudinally into two parts, which are hinged together, so that the lower half G' may be folded inward upon the upper half to allow the same to be moved inward beneath the table-top and over the supporting-strips C when the leaf is in its lowered position and the table closed, suitable stops G² being secured to the side rails to engage the inner sides of the rail-sections G' when the leaf is in place and hold the same in line with the side rails. Secured to the under side of each leaf and adjacent to the outer side of each member E² of the extension-slides is a bracket H, having downwardly-extended arms H', forming supports for the leaf, on the ends of which arms are journaled the antifriction-rolls H², and secured to the outer sides of the member E² are the plates I, each provided with two pairs of downwardly-extending inclined slots or guides I' to receive the rolls H². The upper ends of the slots are extended laterally to form recesses I² to receive the antifriction-rolls, a slight shoulder I³ being provided at the junction of the recesses and slots to prevent the rolls from being too easily disengaged from the recesses. Two of these extra leaves are provided at each end of the table, each plate I being provided with two pairs of slots, one pair for each leaf, which are inclined in opposite directions—that is, each pair is inclined downward toward its end of the plate, so that when the leaves are lowered by extending the table and moving the leaves to disengage the rolls from the recesses I² the leaves will be separated as the rolls move down the inclined slots. This separating of the leaves allows one leaf to be raised at a time, as they will be disconnected—that is, when the ordinary dowel-pin connection is used the dowel will be disengaged from its socket in the opposite leaf. I prefer, however, to use the connection shown, consisting of a plate J, slitted inward from one end to form the spring-arms J', said arms being curved so as to come nearly in contact with each other near their outer ends and cut away at their point of connection to the plate to form a socket to receive a pin K, projecting downward from the lower side of the opposite leaf. Thus when the leaves are brought toward each other the pin K enters the slot and springing the arms apart passes into the socket, where it is held by the spring action of said arms. The table is thus prevented from being accidentally pulled apart, as similar connections are provided between the table-top and the leaves.

The bases of the brackets H extend transversely across the leaves to which they are secured, and thus prevent said leaves from warping, and the arms H' form four supports for each leaf, thus rigidly supporting it in the plane of the table-top, the rolls by their engagement with the recesses I² preventing the leaf from raising above such plane or dropping below it. The shoulders I³ prevent the rolls from being moved into the slots by the extending of the table, and as the slots are inclined the leaves will not suddenly drop when the rolls enter the slots.

If desired, the rail-sections G may be hinged directly to the ends of the leaves, as shown in Fig. 5, instead of making them in halves, or by making a side rail having a scroll edge, as shown in Fig. 6, the width of the rail-sections G⁴ is reduced, and it will not be necessary to hinge the sections at all, it being only necessary, if at all, to slightly cut away the supporting-strips C near their ends.

By inclining the side rails as shown the leaves, with their attached rail-sections, will pass under the table-top and its attached side rails by simply dropping the leaves vertically downward a short distance, which not only throws the table-top and leaves out of the same plane, but the side rails and rail-sections as well.

In Figs. 8 and 9 the essential features of my invention are shown applied to a round table, the extra leaves being inserted in the center of the table-top instead of near each end, thus forming an elliptical table when the same is extended. In this construction short leaves F' are shown, to the ends of which are hinged the end sections F², which are of such a length that when extended they form a continuous leaf of a length equal to the width of the table-top, and secured to their end sections are the rail-sections G³. The same mechanism is employed to support the leaves as in the other forms of table, and when they are lowered the end sections F² are turned down, as shown in Fig. 9, so that the table-top may be closed thereover, and when the leaves are raised the end sections F² are held in the plane of the table-top by the stops F³ and F⁴, secured to the top and to the side rails, respectively.

Having thus fully described my invention, what I claim is—

1. An extension-table comprising a top having a central and end sections, side rails on the central section, supporting means therefor, extension-slides consisting of inner members secured to the said supports, the central section being carried thereby, outer members secured to the end sections of the top, supplementary leaves provided with rail-sections, means carried by said leaves for engagement with the outer members, said means comprising arms depending from the leaves, rollers carried thereby, and plates on the outer members, inclined slots formed in said plates having recesses at their upper ends, shoulders formed between the recesses and slots, the rollers adapted to travel in said slots, and recesses to carry the leaves to a position flush with the table-top, substantially as described.

2. An extension-table comprising a top having a central and end sections, side rails extending downwardly and outwardly from the top to support the same, with supports for the rails, extension-slides consisting of inner members secured to the said supports and carrying the central section of the top, with outer members secured to the end sections of the top, and slidably connected to the inner members, supplementary leaves having rail-sections hinged thereto, a connection between said leaves and the outer members consisting of arms depending from the leaves and carrying rollers, and plates on the outer members having inclined slots formed therein with recesses at their upper ends forming a shoulder at the junction of the slots and recesses, with means for securing the rail-sections of the leaves in alinement with the rails of the central section.

3. In an extension-table the combination of a top, supplementary leaves movable with relation to the top, supporting means for the top and leaves, an inner member carried on said supporting means, outer members slidably connected thereto, connections between said leaves and the outer members, comprising arms depending from the leaves, rollers carried thereby, plates on the outer members having inclined slots therein, provided with recesses at their upper ends, forming shoulders at the junction of the recesses and slots, said rollers adapted to fit in said plates to support and guide the leaves secured to the outer members of the slides, substantially as described.

4. In an extension-table, the combination of a top, side rails supporting the same, supporting-strips for the rails, slides mounted on the strips, supplementary leaves carrying rail-sections, brackets on the said leaves, arms thereon, rollers carried by said arms, plates secured to the said slides, said plates provided with inclined slots formed with recesses at their upper ends, shoulders formed at the junction of the recesses and slots, the bottom of said recesses being below the shoulders, the rollers of the leaves adapted to move in said slots to raise and lower said leaves, substantially as described.

5. In an extension-table the combination with the top, of supplementary leaves movable with relation to the top, said leaves being of equal width with the table, rail-sections hinged at the ends of said leaves and adapted to fold inward and when the leaves are extended to lie in line with the side rails, and be supported thereby, supporting means for the top and leaves, an inner member carried on said supporting means and outer members connected slidably thereto, brackets carrying depending arms secured to said leaves, plates on said outer members having inclined slots therein, with a recess at the upper end of the slot forming a shoulder between itself and the slot, rollers on said arms and adapted to travel in said slots in an upward direction above the level of the top and then move downwardly in said recess to lie flush with the top, substantially as described.

6. In an extension-table the combination with the top, of supplementary leaves movable with relation to the top, supporting means for the top and leaves, with an inner member carried on said supporting means and outer members connected slidably thereto, brackets carrying depending arms secured to said leaves, plates on said outer members having inclined slots therein, with a recess at the upper end of the slot forming a shoulder between itself and the slot, rollers on the supplementary leaves, said rollers adapted to travel in said slots in an upward direction above the level of the top and then move downwardly in said recess to lie flush with the top.

7. In an extension-table, the combination with the top and supporting-frame thereof; of supplementary leaves arranged in pairs, brackets secured transversely across each of said leaves and provided with downwardly-extending arms at their ends, and plates secured to the frame having inclined guide-slots adapted to be engaged by the arms on each pair of leaves, with recesses at the upper ends of the slots forming a shoulder between themselves and the slots, whereby the leaves move upwardly above the top and then downwardly in said recess to lie flush with the top, and be prevented from moving laterally by said shoulder.

8. In an extension-table, in combination, a table-top consisting of a central and end sections, side rails extended downwardly and outwardly from said top to support the same, transverse supporting-strips secured to said rails and provided with legs, extension-slides consisting of an inner member secured to the strips supporting the central section of the top and outer members secured at one end to the end sections of the top and abutting at their inner ends with a connecting-bar engaging said inner and outer members, supplementary leaves, rail-sections secured to the ends of the leaves and divided longitudinally and the parts hinged together, stops on the rails to engage the hinged portion of the rail-sections, brackets on the lower sides of the leaves having arms, rolls on said arms, and plates secured to the outer members of the extension-slides, said plates being provided with inclined slots formed with recesses at their upper ends and shoulders at the junction of the slots and recesses, the bottom of the recesses being below the shoulders, substantially as described.

In testimony whereof I affix my signature in presence of two witnesses.

GEORGE R. ROUGHLEY.

Witnesses:
  OTTO F. BARTHEL,
  LEWIS E. FLANDERS.